(12) United States Patent  
McLean et al.

(10) Patent No.: US 8,080,325 B2  
(45) Date of Patent: Dec. 20, 2011

(54) COVERS FOR ELECTROCHEMICAL CELLS AND RELATED METHODS

(75) Inventors: Gerard F McLean, West Vancouver (CA); Jeremy Schrooten, Mission (CA); Shawn Litster, Pittsburgh, PA (US)

(73) Assignee: Angstrom Power Incorporated, North Vancouver, British Columbia ( * ) Notice: Subject to any disclaimer, the term of this patent is extended or adjusted under 35 U.S.C. 154(b) by 560 days.

(21) Appl. No.: 12/355,564

(22) Filed: Jan. 16, 2009

(65) Prior Publication Data

US 2009/0191435 A1    Jul. 30, 2009

Related U.S. Application Data

(60) Provisional application No. 61/021,822, filed on Jan. 17, 2008.

(51) Int. Cl.  
*H01M 10/44* (2006.01)

(52) U.S. Cl. ............... 429/50; 429/17; 429/34; 429/535

(58) Field of Classification Search .................. 429/456, 429/454, 471, 470, 535, 481, 50, 17, 34  
See application file for complete search history.

(56) References Cited

U.S. PATENT DOCUMENTS

| | | | |
|---|---|---|---|
| 4,708,812 A | 11/1987 | Hatfield | |
| 4,756,958 A | 7/1988 | Bryant et al. | |
| 5,190,834 A | 3/1993 | Kendall | |
| 5,310,765 A | 5/1994 | Banerjee et al. | |
| 5,587,253 A | 12/1996 | Gozdz et al. | |
| 5,861,221 A | 1/1999 | Ledjeff et al. | |
| 5,989,741 A | 11/1999 | Bloomfield et al. | |
| 6,514,362 B1 | 2/2003 | Zuckerman et al. | |
| 6,627,673 B2 | 9/2003 | Topolkaraev et al. | |
| 6,680,139 B2 | 1/2004 | Narayanan et al. | |
| 6,699,611 B2 | 3/2004 | Kim et al. | |
| 7,132,192 B2 | 11/2006 | Muthuswamy et al. | |
| 7,147,271 B2 | 12/2006 | Aase et al. | |
| 7,314,677 B2 * | 1/2008 | Mosdale | 429/483 |
| 7,474,075 B2 | 1/2009 | McLean | |
| 7,632,587 B2 * | 12/2009 | McLean et al. | 429/453 |
| 2002/0182464 A1 | 12/2002 | Kim et al. | |
| 2003/0104273 A1 | 6/2003 | Lee et al. | |
| 2003/0162076 A1 | 8/2003 | Kubota | |
| 2004/0023096 A1 | 2/2004 | Pratt et al. | |
| 2004/0072046 A1 | 4/2004 | Schmidt | |
| 2004/0142229 A1 | 7/2004 | Herman et al. | |
| 2004/0209136 A1 | 10/2004 | Ren et al. | |

(Continued)

FOREIGN PATENT DOCUMENTS

CA    2408587 A1    12/2001

(Continued)

OTHER PUBLICATIONS

"U.S. Appl. No. 11/047,560, Non-Final Office Action mailed Dec. 24, 2008", 12 pgs.

(Continued)

*Primary Examiner* — David Vu

(74) *Attorney, Agent, or Firm* — Schwegman, Lundberg & Woessner, P.A.

(57) ABSTRACT

Embodiments of the invention relate to an electrochemical cell system including a cover that affects reactant flow into an electrochemical cell array.

35 Claims, 6 Drawing Sheets

U.S. PATENT DOCUMENTS

| | | | |
|---|---|---|---|
| 2005/0142410 | A1 | 6/2005 | Higashi et al. |
| 2005/0181250 | A1 | 8/2005 | Beckmann et al. |
| 2005/0250004 | A1 | 11/2005 | McLean et al. |
| 2006/0127734 | A1 | 6/2006 | McLean et al. |
| 2006/0202508 | A1 | 9/2006 | Aase et al. |
| 2006/0228606 | A1 | 10/2006 | Fiebig et al. |
| 2007/0090786 | A1 | 4/2007 | McLean |
| 2007/0166590 | A1 | 7/2007 | Nakano |
| 2008/0008912 | A1 | 1/2008 | Herman et al. |
| 2008/0241607 | A1 | 10/2008 | Owejan et al. |
| 2009/0081493 | A1 | 3/2009 | Schrooten et al. |
| 2009/0081523 | A1 | 3/2009 | Stukas et al. |

FOREIGN PATENT DOCUMENTS

| | | |
|---|---|---|
| CA | 2408588 A1 | 12/2001 |
| CA | 2408538 A1 | 11/2002 |
| CA | 2446121 A1 | 4/2004 |
| EP | 1349227 A2 | 1/2003 |
| JP | 60-58220 A | 4/1985 |
| JP | 2003-297395 A | 10/2003 |
| JP | 2006-252785 A | 9/2006 |
| WO | WO-2008/024401 A1 | 2/2008 |
| WO | WO-2009/039654 A1 | 4/2009 |
| WO | WO-2009/089634 A1 | 7/2009 |
| WO | WO-2009/089634 A8 | 10/2009 |

OTHER PUBLICATIONS

"U.S. Appl. No. 11/047,560, Amendment and Response filed Mar. 2, 2007 to Non-Final Office Action mailed Nov. 2, 2006", 15 pgs.

"U.S. Appl. No. 11/047,560, Interview Summary mailed Feb. 23, 2007", 3 pgs.

"U.S. Appl. No. 11/047,560, Interview Summary mailed Oct. 17, 2006", 2 pgs.

"U.S. Appl. No. 11/047,560, Non-Final Office Action mailed May 3, 2006", 12 pgs.

"U.S. Appl. No. 11/047,560, Non-Final Office Action mailed Jun. 15, 2007", Jun. 15, 2007, 12 pgs.

"U.S. Appl. No. 11/047,560, Non-Final Office Action mailed Nov. 2, 2006", 15 pgs.

"U.S. Appl. No. 11/047,560, Notice of Allowance mailed Jul. 28, 2009", 4 pgs.

"U.S. Appl. No. 11/047,560, Notice of Allowance mailed Sep. 26, 2008", 4 pgs.

"U.S. Appl. No. 11/047,560, Response filed Feb. 8, 2006 to Restriction Requirement mailed Jan. 9, 2006", 2 pgs.

"U.S. Appl. No. 11/047,560, Response filed Mar. 24, 2009 to non Final Office Action mailed Dec. 24, 2008", 11 pgs.

"U.S. Appl. No. 11/047,560, Response filed Aug. 3, 2006 to Non-Final Office Action mailed May 3, 2006", 15 pgs.

"U.S. Appl. No. 11/047,560, Response filed Sep. 17, 2007 to Non-Final Action mailed Jun. 15, 2007", 6 pgs.

"U.S. Appl. No. 11/047,560, Response filed Nov. 8, 2005 to Restriction Requirement mailed Aug. 23, 2005", 2 pgs.

"U.S. Appl. No. 11/047,560, Restriction Requirement mailed Jan. 9, 2006", 5 pgs.

"U.S. Appl. No. 11/047,560, Restriction Requirement mailed Aug. 23, 2005", 5 pgs.

"U.S. Appl. No. 12/238,040, Response filed Sep. 1, 2011 to Non Final Office Action mailed Jul. 20, 2011", 17 pgs.

"U.S. Appl. No. 12/238,040, Non Final Office Action mailed Jul. 20, 2011", 17 pgs.

"Chinese Application Serial No. 200580018178.8, Office Action mailed May 8, 2009", 8 pgs.

"Chinese Application Serial No. 200580018178.8, Response filed Oct. 15, 2010 to Office Action mailled Jun. 11, 2010", 6 pgs.

"Chinese Application Serial No. 200580018178.8, Response filed Nov. 23, 2009 to Office Action dated May 8, 2009", 7 pgs.

"Chinese Application Serial No. 200580018178.8, Second Office Action mailed Jun. 11, 2010", 10 pgs.

"European Application Serial No. 05741066.4, Office Action mailed Feb. 5, 2009", 4 pgs.

"European Application Serial No. 05741066.4, Office Action mailed Sep. 1, 2011", 5 pgs.

"European Application Serial No. 05741066.4, Response filed Jun. 12, 2009 to Communication dated Feb. 5, 2009", 25 pgs.

"European Application Serial No. 11001213.5, Office Action mailed Aug. 30, 2011", 5 pgs.

"International Application Serial No. PCT/CA2005/000669, International Search Report mailed Aug. 18, 2005", 2 pgs.

"International Application Serial No. PCT/CA2005/000669, Written Opinion mailed Aug. 18, 2005", 5 pgs.

"International Application Serial No. PCT/CA2008/001711, International Search Report mailed Dec. 12, 2008", 4 pgs.

"International Application Serial No. PCT/CA2008/001711, Written Opinion mailed Dec. 12, 2008", 6 pgs.

"International Application Serial No. PCT/CA2009/000068, Search Report mailed Apr. 17, 2009", 3 pgs.

"International Application Serial No. PCT/CA2009/000068, Written Opinion mailed Apr. 17, 2009", 7 pgs.

"Singapore Application Serial No. 201002064-2, Office Action mailed Sep. 26, 2011", 9 pgs.

Ichijo, H., et al., "Separation of Organic Substances with Thermo-responsive Polymer Hydrogel", *Polymer Gels and Networks*, 2, (1994), 315-322.

Lee, Y. M., et al., "Synthesis and swelling characteristics of pH and thermoresponsive interpenetrating polymer network hydrogel composed of poly(vinyl alcohol) and poly(acrylic acid)", *Journal of Applied Polymer Science*, 62(2), (1996), 301-311.

"U.S. Appl. No. 12/238,040, Final Office Action mailed Oct. 12, 11", 21 pgs.

"Singapore Application Serial No. 201004893-2, Written Opinion and Search Report mailed Oct. 27, 2011", 18 pgs.

\* cited by examiner

COVERS FOR ELECTROCHEMICAL CELLS AND RELATED METHODS

PRIORITY OF INVENTION

This non-provisional application claims the benefit of priority under 35 U.S.C. §119(e) to U.S. Provisional Patent Application Ser. No. 61/021,822, filed Jan. 17, 2008, which is herein incorporated by reference.

BACKGROUND

Electrochemical cell systems, such as fuel cell systems have been identified as attractive power supplies for a wide range of applications. Environmental conditions both surrounding the system and proximal to the system can influence the operation and performance of electrochemical cells. Favorable environments in proximity to the electrochemical cells can improve cell performance. As examples, humidity, temperature, mass-transport of reactants, and pollutant or contaminant levels present in the electrochemical cell can affect performance of the cell.

Currently, sub-systems can be integrated into an electrochemical cell system to control operating parameters of the electrochemical cell and provide desired conditions within the electrochemical cell. For example, in some fuel cell systems, external humidification systems, heaters and cooling loops, and reactant delivery pumps and flow fields exist for adjusting internal conditions of the fuel cell. Alternately, fuel cell systems have been designed that minimize use of ancillary components by integrating features for passive control of internal conditions. For example, fuel cells having planar architectures for fuel cells have been developed that provide a passive breathing surface for receiving reactant. Water retention barriers can be used to manage water evaporation from the fuel cells. Conventionally, water retention barriers include porous materials disposed over the active areas and impermeable frames sealed around the perimeter of the fuel cells.

Active control systems can result in substantial parasitic power losses and a larger overall footprint. Further, existing technologies which attempt to passively control internal conditions still exhibit membrane dehydration and significant performance losses. For fuel cells using flow fields, overall performance can be low as a result of uneven water content and localized hot spots across the fuel cell even though a net self-humidifying environment may be possible. For planar fuel cell architectures, evaporation of water from passive breathing surfaces can still cause membrane dehydration, and performance remains limited by insufficient water content in the membrane.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

SUMMARY

Figure 1:
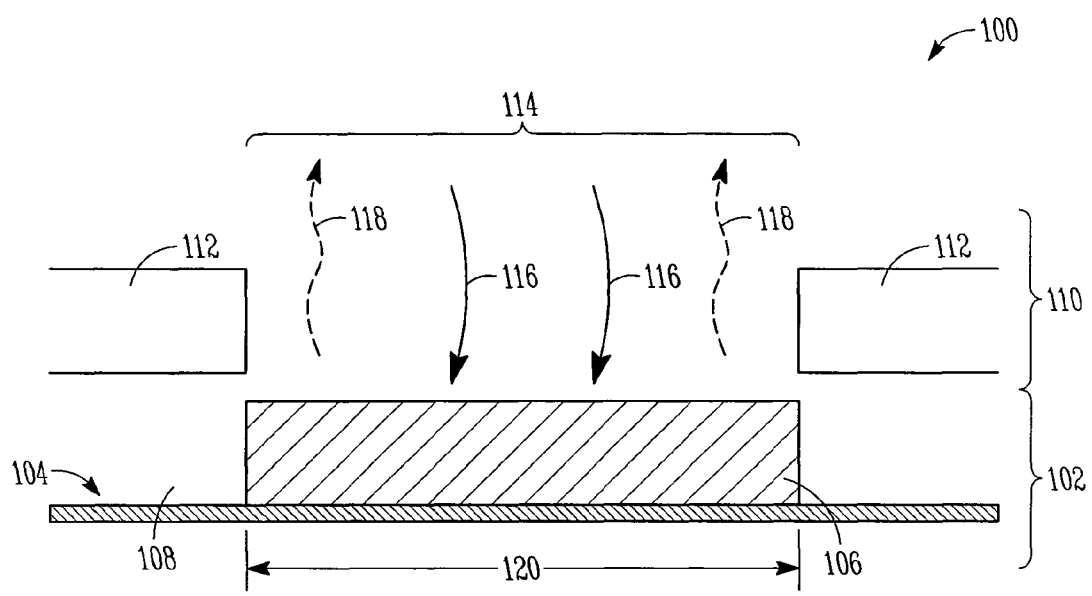
FIG. 1 illustrates a cross-sectional view of a prior art electrochemical cell system.

Embodiments of the present invention relate to an electrochemical cell system. The system includes an array of electrochemical cells, including a reactive surface, the surface having one or more active regions and one or more less-active regions in contact with the one or more active regions. The system also includes a cover, including a transport layer having one or more transport barrier regions and one or more opened regions. The transport barrier regions are in proximity to the active regions and the opened regions are in proximity to the less-active regions.

Embodiments also relate to an electrochemical cell array cover including a transport layer, including one or more transport barrier regions and one or more opened regions. The transport barrier regions overlay one or more active regions of one or more electrochemical cells of an electrochemical array.

Embodiments also relate to a method for operating an electrochemical cell array, including contacting active regions of an electrochemical cell array with a reactant fluid via opened regions in a cover and inhibiting a product fluid from being removed from the local environment through use of the cover.

DETAILED DESCRIPTION

The Detailed Description includes references to the accompanying drawings, which form a part of the Detailed Description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Embodiments of the invention relate to a cover for an electrochemical cell array and related system. The present invention relates to a novel structural relationship between active regions of an electrochemical cell array and transport barrier regions integrated in a cover that unexpectedly improves performance. Specifically, transport barrier regions of the cover are arranged in proximity to the active regions of the electrochemical cells to provide a transport shield between the active regions and the external environment. The transport barrier regions may shield all or a portion of the active regions. In some embodiments, the electrochemical cell may be a fuel cell.

Conventionally, operation of electrochemical cells, such as fuel cells, at higher current densities typically favors increasing mass-transport to the active areas by opening or expanding regions in proximity to active areas. However, embodiments of the present invention allow for sufficient reactant delivery to the active areas when using materials with transport barriers between the active areas and the external environment by instead providing an indirect flow pathway to the active areas via less-active areas surrounding the active areas.

This indirect flow pathway can facilitate a microclimate or local environment that provides more favorable conditions across the active area to improve performance of the fuel cells. This indirect flow path may effectively reduce transport to the active regions orthogonal to the reactive surface and increase transport to the active regions in-plane to the reactive surface and may further include tortuous flow through a porous layer. The indirect flow contacts all or only a portion of the perimeter of the active regions of the electrochemical cells.

The cover can be integrated in a housing of a portable device, for example as described in commonly-owned U.S. Patent Application Publication No. 2007/0090786, entitled "Devices powered by conformable fuel cells" and commonly-owned U.S. Patent Application Publication No. 2006/0127734, entitled "Flexible fuel cells having external support", the disclosures of which are herein incorporated by reference in their entirety. The cover can be disposed on a passive reactant delivery surface of the fuel cells. Architectures of fuel cells may be planar, although the covers can conform to any suitable architecture. Examples of such fuel cells can be found in commonly owned U.S. Patent Application Publication No. 2005/0250004, entitled "ELECTROCHEMICAL CELLS HAVING CURRENT-CARRYING STRUCTURES UNDERLYING ELECTROCHEMICAL REACTION LAYERS,", and commonly-owned U.S. patent application Ser. No. 12/238,241, entitled "Fuel cell systems including space-saving fluid plenum and related methods", filed Sep. 25, 2008, the disclosures of which are herein incorporated by reference in their entirety. Materials included in the cover can include combinations of conductive and non-conductive materials.

DEFINITIONS

As used herein, "reactive surface" refers to a surface of an electrochemical cell array in which all or a portion of an electrochemical reaction is supported or carried out.

As used herein, "active region" refers to reactive areas in contact with or integrated into a reactive surface of an electrochemical cell or cell array. The active regions support all or a portion of an electrochemical reaction. The active regions may include one or more catalysts, conductive or non-conductive materials or gas-diffusion layers, as examples.

As used herein, "less-active region" refers to an area in contact with or integrated into a surface of an electrochemical cell or cell array in which no electrochemical reactions occur or are supported or only a negligible amount occurs or is supported. Less-active regions may include current collectors, structural support members or insulating gaps.

As used herein, "transport layer" refers to a region in an electrochemical cell cover providing a flow path for a reactant flow. The reactant flow may be actively or passively moved through the flow path. The transport layer may include transport barrier regions and opened regions, for example.

As used herein, "transport barrier region" refers to materials or components that impede, affect, or block transport mechanisms. The transport barrier regions may be a mechanical cover and may be substantially or fully impermeable to air or water, or a fuel cell reactant (e.g. fuel) for example. For example, the mechanism impeded, affected, or blocked may be any combination of transport mechanisms including water evaporation from the active areas (e.g. due to reduced convective fluid flow over the active regions), fully or partially demobilized water vapor, heat transfer (direction independent) between the active regions and the external environment, reduced influx of pollutants and/or contaminants (for example CO, $NH_3$, $NO_x$, Volatile Organic Compounds, salts), current transfer (or lack thereof) from the active areas, etc. These mechanisms can provide other beneficial conditions such as increased relative humidity in the electrochemical cell, membrane hydration, higher operating pressures, higher limiting current densities, improved in-plane conductivity, etc. The transport barrier regions may be conductive or non-conductive or may be composite, comprising conductive and non-conductive regions. Conductivity may refer to electrical conductivity or thermal conductivity. If electrically conductive, the transport barrier regions may be electrically isolated from the active regions. A portion of the one or more transport barrier regions may be electrically conductive, thermally conductive, or a combination thereof, for example. The transport barrier regions may be electrically insulating, thermally insulating, or combinations thereof.

As used herein, "opened region" refers to a pathway through which reactant may flow. Opened regions may be holes, vents, slots, panels, pores or a porous material or layer.

As used herein, "electrochemical array" refers to an orderly grouping of electrochemical cells. The array may be planar or cylindrical, for example. The electrochemical cells may include fuel cells, such as edge-collected fuel cells. The electrochemical cells may include batteries. The electrochemical cells may be galvanic cells, electrolyzers, electrolytic cells or combinations thereof. Examples of fuel cells include proton exchange membrane fuel cells, direct methanol fuel cells, alkaline fuel cells, phosphoric acid fuel cells, molten carbonate fuel cells, solid oxide fuel cells, or combinations thereof. The electrochemical cells may include metal-air cells, such as zinc air fuel cells, zinc air batteries, or a combination thereof.

As used herein, "two-dimensional (2-D) fuel cell array" refers to a sheet which is thin in one dimension and which supports a number of fuel cells. A two-dimensional fuel cell array may be a flexible fuel cell layer. A flexible fuel cell layer may be flexible in whole or in part, so-as-to embrace, for example, an electrochemical layer having one or more rigid components integrated with one or more flexible components. The fuel cells have active areas or active regions of one type (e.g. cathodes) that are accessible from one face of the sheet and active areas or active regions of another type (e.g. anodes) that are accessible from an opposed face of the sheet. The active areas may be disposed to lie within areas on their respective faces of the sheet (e.g. it is not mandatory that the entire sheet be covered with active areas, however, the performance of a fuel cell may be increased by increasing its active area.

As used herein, "external environment" or "external conditions" or "environmental conditions" refer to the atmosphere in proximity to the cover, whether that environment resides inside or outside a device or housing. External conditions include temperature, humidity, pollutant or contaminant level, for example.

As used herein, "local environment" or "microclimate" or "local conditions" refer to the atmosphere in the proximity of the active region(s) of the electrochemical cell array. Such microclimate may be the environment in which reactant fluids interact with active regions of an electrochemical cell. For example, the local environment may refer to the atmosphere in the volume between the active region and the transport barrier region of the cover. Local conditions may include temperature, humidity, pollutant or contaminant level, for example.

As used herein, "metal-air cells" refer to an electrochemical cell including zinc air fuel cells, zinc air batteries or a combination thereof.

Referring to FIG. 1, a cross-sectional view 100 of a conventional electrochemical cell system is shown. The electrochemical cell system may include a combination of active regions 106 interspersed with less-active regions 108, disposed on a reactive surface 104. In a planar electrochemical cell layer, the anodes and cathodes may be disposed on opposing sides of the layer. In a fuel cell, a fuel (e.g. hydrogen, methanol, butane, formic acid) is provided to the anodes (not shown) of the fuel cell layer 102, while an oxidant 116 (e.g. air) is provided to the active region 106 (e.g. a cathode) on a reactive surface 104. The fuel and oxidant react to form electricity and reaction products 118 (e.g. water vapor, $CO_2$, etc, depending on fuel composition). Fuel cells often need some form of external structure to provide support, compression, etc, to ensure proper operation. Since the electrochemical reaction is dependent on reactant access to the active regions, conventional logic would dictate locating non-porous areas of any such support system or cover away from the active areas of the fuel cells. As illustrated in FIG. 1, non-porous regions or transport barriers 112 are located proximal to less-active regions 108 of the fuel cell array, while opened regions 114 are located proximal to active regions 106 of the array. In such a fashion, maximum air access 116 is provided to the active regions 106 of the array. Further, reactant products 118 can easily be removed from the reaction sites.

A further consideration for operation of electrochemical cell arrays, such as fuel cell arrays using proton exchange membranes (PEM), is water balance. Proton exchange membranes require a certain amount of hydration in order to facilitate proton transport, as the proton conductivity is influenced by the water content of the membrane. However, there must not be so much water that the electrodes that are bonded to the electrolyte flood, blocking the pores in the electrodes or gas diffusion later. A balance is therefore needed, between sufficient humidification of the membrane and sufficient evaporation of water from the cathodes. This balance can be difficult to achieve, particularly in passive fuel cells.

Figure 2:
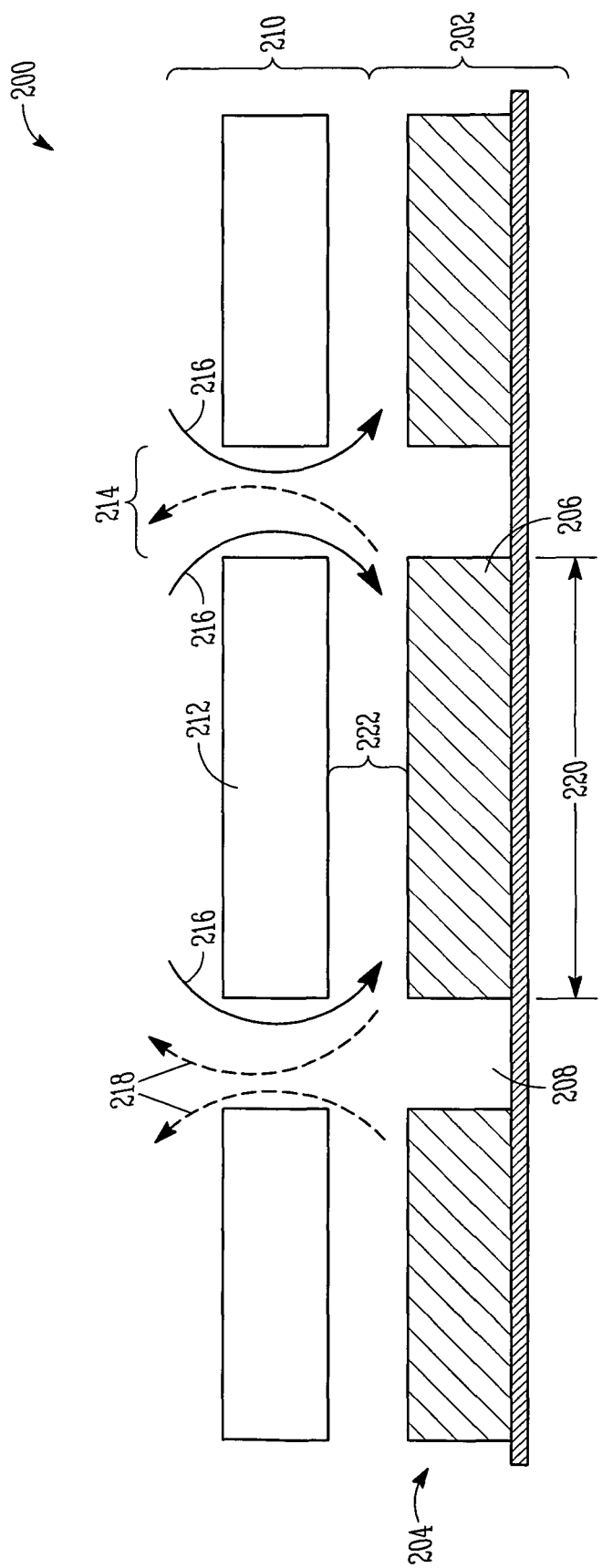
FIG. 2 illustrates a cross-sectional view of an electrochemical cell system, including an off-set cover, according to some embodiments.

Referring to FIG. 2, a cross-sectional view 200 of an electrochemical cell system, including an off-set cover is shown, according to some embodiments. An electrochemical cell array 202 may include one or more active regions 206 and one or more less-active regions 208, disposed on a reactive surface 204. The less-active regions 208 may be in contact with or surround the active regions 206, or may be interposed with the active regions 206, and may optionally separate adjacent active regions 206. The active regions 206 may alternate with the less-active regions 208, for example, such that each active region 206 is adjacent a less-active region 208 on each side of the active region 206. The active regions 206 may have a width (w) 220. A transport layer 210, which may also be referred to as a 'cover', may include opened regions 214 and transport barrier regions 212. In the illustrated embodiment, the transport barrier regions 212 may be substantially aligned with the active regions 206 of the electrochemical cell array, while the opened regions 214 may be substantially aligned with the less-active regions 208 of the array. In such a configuration, rather than a reactant flow 116 having direct access to the active region 106 (as illustrated in FIG. 1), the reactant flow 216 may instead be indirectly provided to the active region 206 (as illustrated in FIG. 2). In such embodiments, the reactant flow may be directed to the reaction sites of the active region 206 along the plane of the active region 206 from the perimeter of the active region 206, rather than directly contacted with the active region.

In the embodiment shown in FIG. 2, the air access to the active areas may be proportional to the length (into the page) of the active region and the dimension of the air gap δ 222 and inversely proportional to the width w (220) of the active region. By contrast, the air access to the active area of the array illustrated in FIG. 1 may be proportional to the length (into the page) of the active region 106 and the width 120 of the active region 106. Depending on the dimensions of the active region and the air gap, air access to the active regions shown in FIG. 2 may be reduced (e.g. relative to the array shown in FIG. 1). Further, transport of oxidant to reaction sites of the active region 206 may occur by diffusion, rather than convective transport of oxidant. In order for the array to operate correctly, at least a stoichiometric quantity of oxidant needs access to reaction sites of the active region; however, it may be advantageous to limit oxidant access beyond stoichiometric quantities to prevent drying of the membrane.

Modeling results show that the configurations shown in FIG. 2 may have practical size limits. In an embodiment where the electrochemical cell array is an air-breathing fuel cell array, and the off-set cover is disposed in proximity to the cathodes of the array, in order for the fuel cell to still get enough oxygen to operate, equation 1

$$\left(L = \sqrt{\frac{32 D_{O_2} h_p F c^o_{O_2}}{I}}\right)$$

may be used to calculate the oxygen diffusion distance where $D_{O2}$ is oxygen diffusivity, $h_f$ is δ 222, F is Faraday's constant (96485 C), $c^o_{o2}$ is oxygen concentration at the edge of the transport barrier region, I is oxygen consumption rate (current density). Current density and oxygen consumption rate also affect the oxygen availability; at higher consumption rates more oxygen access may be required to support device operation.

Figure 8:
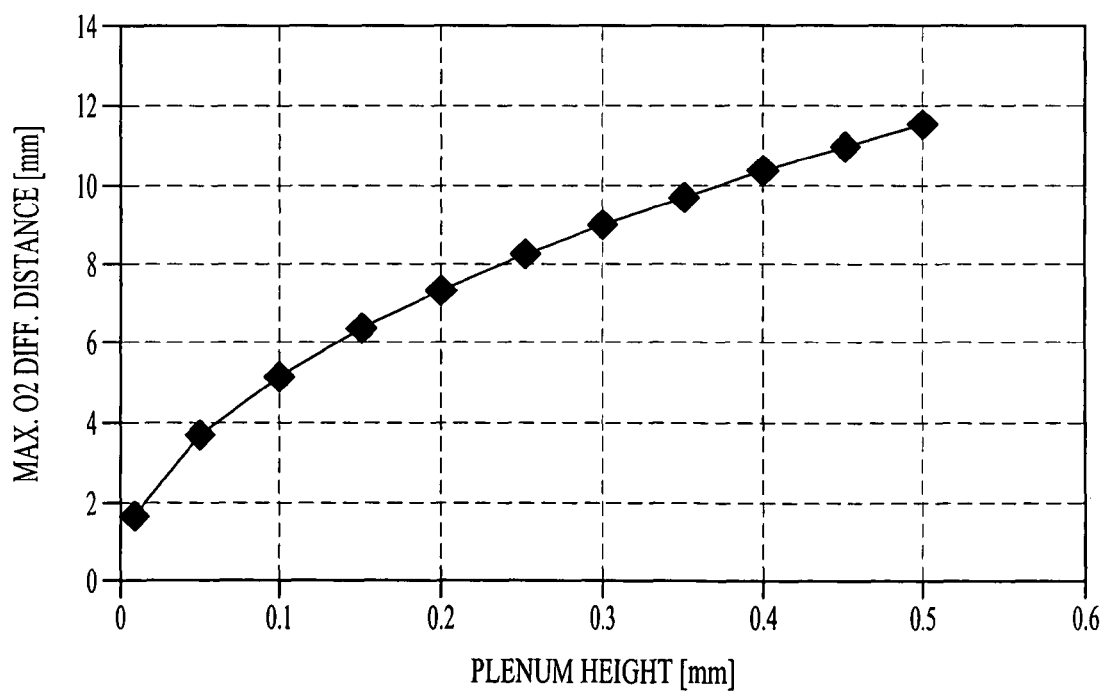
FIG. 8 illustrates a graphical view of modeling results of calculated diffusion length versus gap height, according to some embodiments.

FIG. 8 illustrates the maximum distance oxygen can diffuse laterally under a solid cover versus the height of the plenum (δ—222 in FIG. 2), assuming the oxygen is diffusing through a space filled with air (as opposed to through a porous layer) and that the current density, I, is 125 mA/cm$^2$ and oxygen concentration at the edge of the transport barrier region, $c^o_{o2}$, is 0.1.

Figure 3:
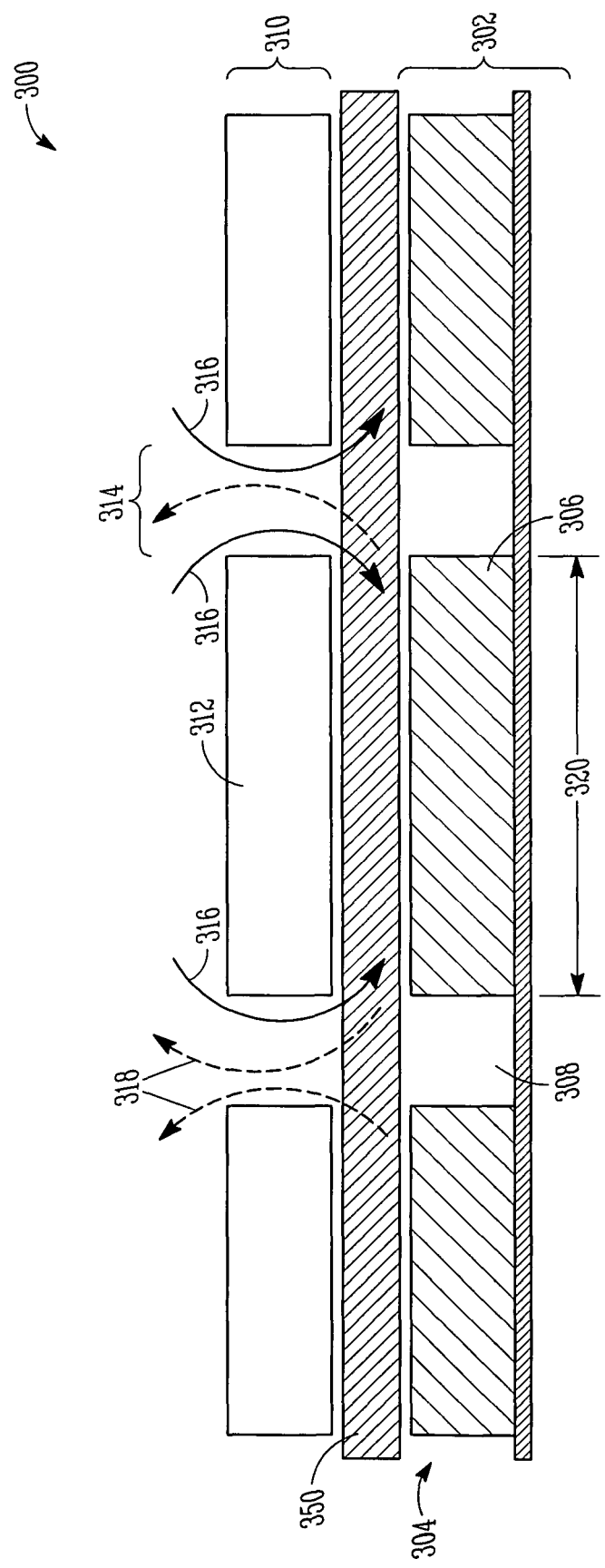
FIG. 3 illustrates a cross-sectional view of an electrochemical cell system, including an off-set cover with optional porous layer, according to some embodiments.

Referring to FIG. 3, an optional porous intermediate layer 350 may be disposed between the transport layer 310 and the array 302. The array 302 may include a reactive surface 304 in which the active regions 306 and less-active regions 308 are supported by or integrated into. The porous intermediate layer 350 may be positioned between the reactive surface 304 and transport layer 310. The porous layer may be its own discrete entity, disposed on the reactive surface 304 of the array 302, may be integrated into all or part of the reactive surface 304, or may be integrated into the transport layer 310. If a porous layer is disposed between the array and the cover, then the modeling results would be affected by a different (e.g. lower) diffusivity of fluid through the porous layer relative to an open space. Consequently, the addition of a porous layer may impact the maximum allowable width w (322) of the active region. For instance, if the diffusivity of fluid in the porous media is lower than the diffusivity of fluid in an open space, then the maximum diffusive length (and therefore maximum width of the active region) would be lower than in an embodiment with no porous media between the cover and the cell.

In addition to affecting reactant supply to the electrochemical cell, the cover, including transport barrier region placement and size, opened region placement and size, and optional porous layer, may further affect removal of reaction product fluids from the local environment proximal to the array. For example, in an air-breathing fuel cell array, the cover may affect access of oxygen to the cathodes of the array, but may also impede removal of product water vapor from the local environment. A porous layer may provide benefit by affecting diffusivity in the local environment, such that sufficient oxygen is provided to the cathodes to support the electrochemical reaction, but that diffusion of product water is inhibited sufficient to provide adequate proton conductivity in the ion exchange membrane to also support the reaction, but not inhibited to the point that the cathodes of the fuel cell array become flooded with too much water.

In another example, the cover may be disposed proximal to the anodes of a fuel cell array, and may affect rate and quantity of fuel provided to the anodes.

The porous layer may be manufactured of an adaptable material. The porous layer may be manufactured of a thermo-responsive polymer. The polymer may include a plurality of pores. Adaptive materials included in the cover can respond to conditions external to the cover, conditions at or near the fuel cells, active control mechanisms, other stimuli, or any combination thereof. Some examples of conditions include temperature, humidity, an electrical flow, etc. One example of a thermo-responsive adaptable material is described in U.S. Pat. No. 6,699,611, filed May 29, 2001, entitled "FUEL CELL HAVING A THERMO-RESPONSIVE POLYMER INCORPORATED THEREIN," the disclosure of which is incorporated herein.

The cover may include multiple components or layers. For example, the cover may include a porous layer disposed between a transport layer (having the transport barrier regions and opened regions) and the electrochemical cells. The cover, the exterior layer, the porous layer, other suitable layers, or any combination thereof may be removable and/or may include an adaptive material responsive to stimuli. Examples of covers having removable features and adaptive materials are described in commonly-owned co-pending U.S. patent application Ser. No. 12/238,040, filed Sep. 25, 2008, entitled "FUEL CELL COVER," the disclosure of which is herein incorporated by reference.

Referring to FIGS. 2 and 3, the cover or transport layer includes transport barrier regions 212, 312 in proximity to active regions 206, 306 and opened regions 214, 314 in proximity to less-active regions 208, 308 of the electrochemical cells. The transport barrier regions 212, 312 may be disposed such that they are substantially aligned with the active regions 206, 306, or may be disposed such that they are of slightly smaller width than the active region width (w) 220, 320 or slightly larger than the active region width 220, 320. In such embodiments, it is possible that the transport barrier regions 212, 312 may overlap the less-active regions 208, 308. Proportionally, the portion of the transport barrier region 212, 312 disposed above the active regions 206, 306 may be greater than the portion over the less-reactive regions 208, 308. The opened regions 214, 314 allow reactants to contact the electrochemical cell array—the size of the opened regions may be varied to allow more or less reactant access to the array. In some embodiments, the cover can be used to affect transport of an oxidant to the cathode regions of one or more fuel cells. The transport barrier region 212, 312 may align fully with the active regions 206, 306 or overlap the active regions 206, 306. The opened regions 214, 314 may substantially align with the less-active regions 208, 308, or may be smaller or larger in width than the less-active regions 208, 308. If the transport barrier regions 212, 312 are electrically conductive, they may be partially or fully electrically isolated from the active regions 206, 306. This may be accomplished by substantially insulating the transport barrier regions 212, 312 from the active regions 206, 306, insulating the transport barrier regions 212, 312 from the less-active regions 208, or insulating the transport barrier regions 212, 312 from at least a portion of either, for example. Transport barrier regions 212, 312 may be insulated from selected active regions and less-active regions so as to avoid a short-circuit between neighboring cells in an array. It will be understood by those skilled in the art that there are many variations in electrical configurations possible (e.g. parallel, serial, combinations thereof), and electrical insulation may be determined accordingly.

Figure 4:
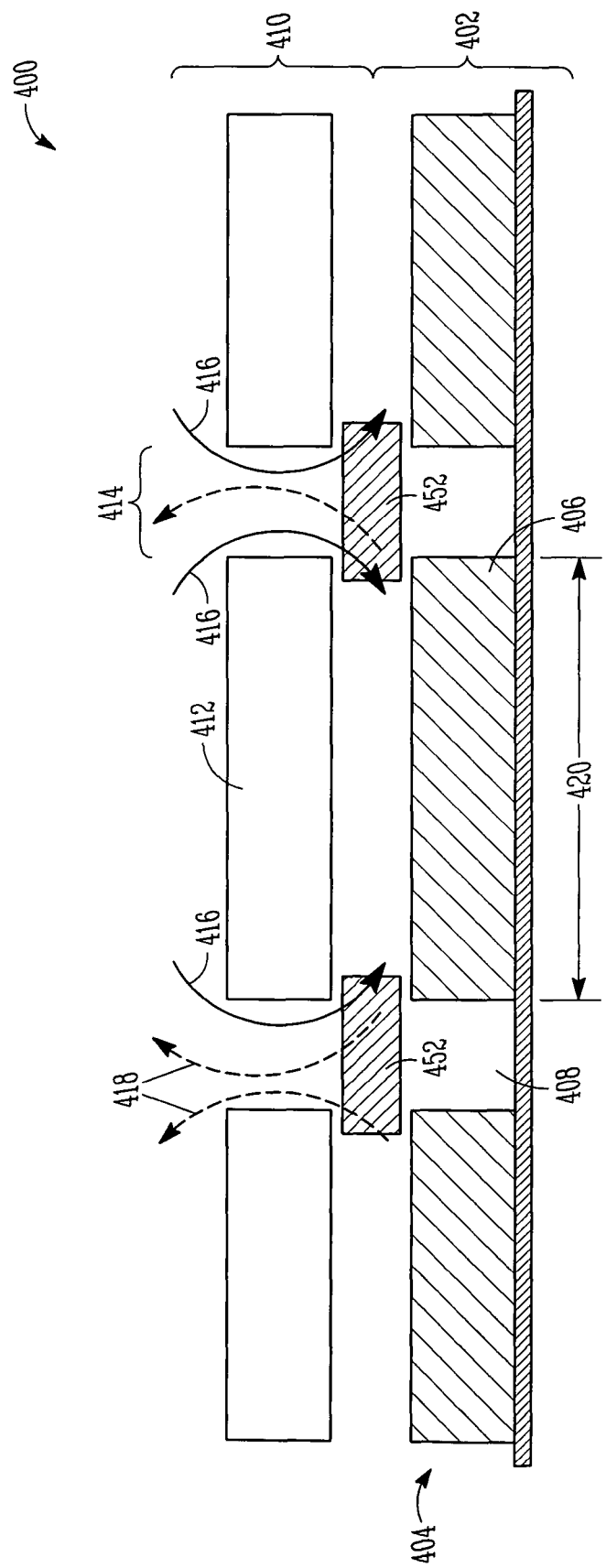
FIG. 4 illustrates a cross-sectional view of an electrochemical cell system, including an off-set cover with an optional porous layer, according to some embodiments.

Referring to FIG. 4, a cross-sectional schematic of an embodiment wherein the porous intermediate layer 452 does not extend across the entirety of the electrochemical cell array 402. It should be understood that the schematic is solely for illustrative purposes, and that the porous intermediate layer 452 may be larger or smaller than illustrated, or, alternatively, the porous layer may extend across the width 422 of the active regions 406, but have a discontinuity across the less-active regions 408. While the discussions above reference contacting an oxidant to the cathodes of an electrochemical cell array, the same principles may be applied to the contacting a reactant (e.g. fuel) with the anodes of an electrochemical cell array.

Figure 5:
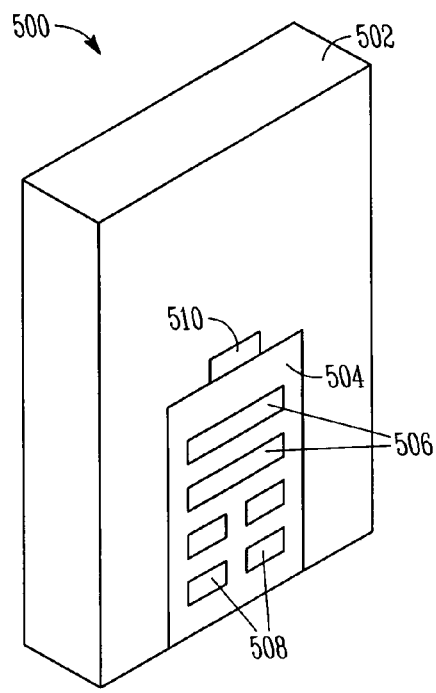
FIG. 5 illustrates a perspective view of an electronic device powered by an electrochemical cell utilizing an off-set cover, according to some embodiments.
Figure 6:
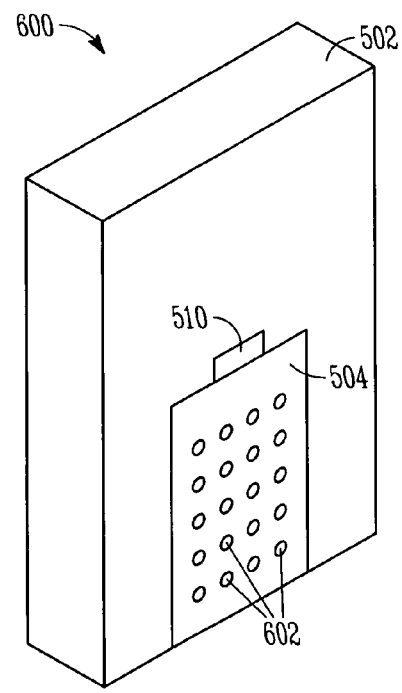
FIG. 6 illustrates a perspective view of an electronic device utilizing an off-set cover, according to some embodiments.

Referring to FIG. 5, a perspective view 300 of an electronic device powered by an electrochemical cell utilizing an off-set cover is shown, according to some embodiments. An off-set cover 304 may be attached or in contact with an electronic device 302. The cover 304 may include openings 306, 308, such as vents, slots or panels. The cover 304 may include a plurality or pores or holes 402 (see FIG. 6).

Panels may be configured into the cover to vary the dimensions of opened regions or openings 306, 308. The cover 304 may also include a porous material, for example. Panels may be provided that modify the aperture of the opened regions or openings 306, 308 (e.g. by sliding across the opened regions) to vary reactant flow between the active regions and the external environment. The position of the panels can be varied to adapt to various electrochemical cells having exposed active regions. For example, the panels may be positioned to selectively expose portions of active areas of electrochemical cells or selectively expose portions of the electrochemical cell array. The position of the panels can be user actuated via manual or electronic mechanisms or can be actuated based on detected conditions. Some examples of conditions for varying the position of the panels include external environmental conditions, performance of the system, and modes, such as standby or power delivery modes, of the portable application device.

The electronic device 302 may be a fuel cell powered device. The device 302 may be a cellular phone, satellite phone, PDA, smartphone, laptop computer, computer accessory, ultra mobile personal computer (UMPC), display, personal audio or video player, medical device, television, transmitter, receiver, lighting device, flashlight or electronic toys. The device 302 may be a refueler, such as an electrolyser, for fuel cell powered electronic devices, for example. A fuel for a fuel cell may be hydrogen, for example, although any suitable fuel such as methanol, ammonia borane, hydrazine, ethanol, formic acid, butane, borohydride compounds etc. may be utilized.

The cover 304 may be removable or may be integrated into the housing of the device 302. One or more transport barrier regions of the cover 304 may be integrated into the housing of the device 302, for example.

Figure 7:
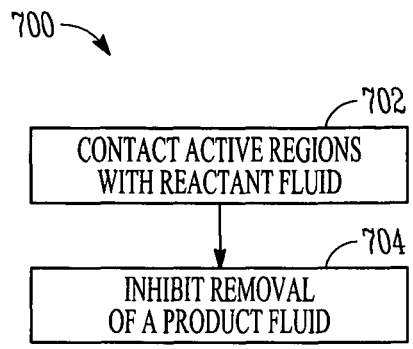
FIG. 7 illustrates a block flow diagram of a method of delivering a reactant to an electrochemical cell array, according to some embodiments.

Referring to FIG. 7, a block flow diagram 700 of a method of operating an electrochemical cell array is shown, according to some embodiments. An electrochemical cell array may include a reactive surface, having one or more active regions and one or more less-active regions in contact with the one or more active regions. The active regions may include a catalyst and an ion-exchange membrane. A cover may include opened regions through which fluids may pass and transport barrier regions which are partially or substantially impermeable to fluids. The transport barrier regions of the cover may be in proximity to the active regions of the array and the opened regions of the cover may be in proximity to the less-active regions of the array. The cover and the reactive surface of the electrochemical cell array may define a local environment in proximity to the active regions of the array.

Active regions of an electrochemical cell array may be contacted with a reactant fluid via opened regions in a cover. Further, a product fluid may be inhibited from being removed from the local environment proximal to the electrochemical cell through use of the cover.

In the case of a fuel cell array with an ion exchange membrane, inhibiting removal of a product fluid may further result in hydrating or humidifying the ion-exchange membrane, which may be beneficial for operation of the array.

Contacting 702 and inhibiting 704 may be passive, such as by diffusion. The reactant may follow an indirect path to the active regions (via the opened regions in the cover), which may lower the velocity of the reactant. Such a reactant flow may be more diffusive than convective, for example.

Contacting 702 the reactant flow with the active regions and inhibiting 704 removal of product fluid may be affected, restricted or obstructed. Affecting may include varying the dimension of the opened regions or directing the flow of reactant through a porous layer, for example. If the porous layer includes an adaptable material, affecting may include varying a property of the adaptable material. The property of an adaptable material may be its porosity, for example. Contacting 702 and inhibiting 704 may be varied in response to an environmental condition in proximity to the electrochemical cells of the array. The environmental conditions may include one or more of a temperature, humidity, or environmental contaminants level.

Contacting 702 and inhibiting 704 may also be varied in response to a signal, for example. For example, the adaptive material may be heated in response to a signal. By heating the adaptive material, one or more of the adaptive material properties may be varied. In another example, the aperture of the opened regions may be enlarged or reduced in response to a signal.

The performance of the electrochemical cell array may be determined periodically or continuously monitored.

The above description is intended to be illustrative, and not restrictive. For example, the above-described examples may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. An electrochemical cell system, comprising:
   an array of electrochemical cells, including a reactive surface, the surface having one or more active regions and one or more less-active regions in contact with the one or more active regions; and
   a cover, including a transport layer having one or more transport barrier regions and one or more opened regions;
   wherein the transport barrier regions are in proximity to the active regions and wherein the opened regions are in proximity to the less-active regions.

2. The system of claim 1, wherein the transport barrier regions are substantially aligned with the active regions.

3. The system of claim 1, wherein the opened regions are substantially aligned with the less-active regions.

4. The electrochemical cell system of claim 1, wherein the electrochemical cells comprise fuel cells.

5. The electrochemical cell system of claim 4 wherein fuel cells comprise proton exchange membrane fuel cells, direct methanol fuel cells, alkaline fuel cells, phosphoric acid fuel cells, molten carbonate fuel cells, solid oxide fuel cells, or combinations thereof.

6. The electrochemical cell system of claim 1, wherein the one or more less-active regions separate adjacent active regions.

7. The electrochemical cell system of claim 1, wherein the electrochemical cells comprise galvanic cells, electrolytic cells, electrolyzers or combinations thereof.

8. The electrochemical cell system of claim 1, wherein the electrochemical cells comprise metal-air cells.

9. The electrochemical cell system of claim 1, wherein the one or more active regions comprise one or more catalysts.

10. The electrochemical cell system of claim 1, wherein the cover is removable.

11. The electrochemical cell system of claim 1, wherein the cover is integrated into a housing for a portable device.

12. The electrochemical cell system of claim 1, wherein the one or more transport barrier regions are substantially impermeable to water.

13. The electrochemical cell system of claim 1, wherein the one or more transport barrier regions are substantially impermeable to air.

14. The electrochemical cell system of claim 1, wherein at least a portion of the one or more transport barrier regions are electrically conductive, thermally conductive, or combinations thereof.

15. The electrochemical cell system of claim 14, wherein the conductive portions of the transport barrier regions are electrically isolated from at least a portion of the reactive surface.

16. The electrochemical cell system of claim 1, wherein the one or more transport barrier regions are electrically insulating, thermally insulating, or combinations thereof.

17. The electrochemical cell system of claim 1, further comprising a porous layer.

18. The electrochemical cell system of claim 17, wherein the porous layer is disposed between the cover and the array of electrochemical cells.

19. The electrochemical cell system of claim 17, wherein the porous layer is disposed on the reactive surface of the array.

20. An electrochemical cell array cover, comprising:
a transport layer, including one or more transport barrier regions and one or more opened regions;
wherein the transport barrier regions overlay one or more active regions of one or more electrochemical cells of an electrochemical array.

21. The electrochemical cell array cover of claim 20, wherein the cover is removable.

22. The electrochemical cell array cover of claim 20, further comprising panels configured to vary the dimensions of the one or more opened regions.

23. The electrochemical cell array cover of claim 20, wherein the one or more transport barrier regions are electrically conductive, thermally conductive, or combinations thereof.

24. The electrochemical cell array cover of claim 20, wherein the opened regions comprise slots, vents, holes, a porous material, or a combination thereof.

25. The electrochemical cell array cover of claim 20, further comprising a porous layer.

26. The electrochemical cell array cover of claim 25, wherein the porous layer comprises an adaptable material.

27. The electrochemical cell array cover of claim 25, wherein the porous layer comprises a thermo-responsive polymer.

28. The electrochemical cell array cover of claim 27, wherein the thermo-responsive polymer includes a plurality of pores.

29. The electrochemical cell array cover of claim 28, wherein the pores are reduced at higher temperatures.

30. A method for operating an electrochemical cell array, comprising:
contacting active regions of an electrochemical cell array with a reactant fluid via opened regions in a cover,
the electrochemical cell array including a reactive surface, the surface having one or more active regions and one or more less-active regions interposed with the one or more active regions,
the cover including
opened regions through which fluids may pass, and
transport barrier regions which are substantially impermeable to fluids
wherein the transport barrier regions of the cover are in proximity to the active regions of the array and
wherein the opened regions of the cover are in proximity to the less-active regions of the array and
wherein the cover and the reactive surface of the electrochemical cell array define a local environment in proximity to the active regions of the array,
inhibiting a product fluid from being removed from the local environment through use of the cover.

31. The method of claim 30, wherein the active regions comprise a catalyst and an ion-exchange membrane, the method further comprising hydrating the ion-exchange membrane with the product fluid.

32. The method of claim 30, further comprising varying the rate of contacting reactant fluid with the active regions and varying inhibiting product fluid removal.

33. The method of claim 32, wherein varying the rate comprises changing the dimensions of the opened regions of the cover.

34. The method of claim 32, wherein varying the rate comprises directing the fluid through a porous layer.

35. The method of claim 34, wherein the porous layer comprises an adaptive material.

* * * * *

UNITED STATES PATENT AND TRADEMARK OFFICE
CERTIFICATE OF CORRECTION

PATENT NO. : 8,080,325 B2
APPLICATION NO. : 12/355564
DATED : December 20, 2011
INVENTOR(S) : Gerard F. McLean et al.

It is certified that error appears in the above-identified patent and that said Letters Patent is hereby corrected as shown below:

On page 2, under "Other Publications", in column 2, line 14, delete "mailled" and insert -- mailed --, therefor.

In column 6, line 58, delete "$h_f$" and insert -- $h_g$ --, therefor.

In column 8, line 55, delete "300" and insert -- 500 --, therefor.

In column 8, line 58, delete "304" and insert -- 504 --, therefor.

In column 8, line 59, delete "302" and insert -- 502 --, therefor.

In column 8, line 59, delete "304" and insert -- 504 --, therefor.

In column 8, line 59, delete "306, 308," and insert -- 506, 508, --, therefor.

In column 8, line 60, delete "304" and insert -- 504 --, therefor.

In column 8, line 61, delete "402" and insert -- 602 --, therefor.

In column 8, line 63, delete "306, 308." end insert -- 506, 508. --, therefor.

In column 8, line 63, delete "304" and insert -- 504 --, therefor.

In column 8, line 66, delete "306, 308" and insert -- 506, 508 --, therefor.

In column 9, line 13, delete "302" and insert -- 502 --, therefor.

In column 9, line 14, delete "302" and insert -- 502 --, therefor.

Signed and Sealed this
Fourth Day of September, 2012

David J. Kappos
*Director of the United States Patent and Trademark Office*

CERTIFICATE OF CORRECTION (continued)
U.S. Pat. No. 8,080,325 B2

In column 9, line 19, delete "302" and insert -- 502 --, therefor.

In column 9, line 25, delete "304" and insert -- 504 --, therefor.

In column 9, line 26, delete "302" and insert -- 502 --, therefor.

In column 9, line 27, delete "304" and insert -- 504 --, therefor.

In column 9, line 28, delete "302" and insert -- 502 --, therefor.